(12) United States Patent
Kwon et al.

(10) Patent No.: US 9,508,123 B2
(45) Date of Patent: Nov. 29, 2016

(54) IMAGE DIRECTION DETERMINATION

(71) Applicant: KT Corporation, Seongnam-si, Gyeonggi-do (KR)

(72) Inventors: Jae-cheol Kwon, Daejeon (KR); Jongsung Kim, Suwon-si (KR)

(73) Assignee: KT CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/337,452

(22) Filed: Jul. 22, 2014

(65) Prior Publication Data

US 2015/0030259 A1   Jan. 29, 2015

(30) Foreign Application Priority Data

Jul. 23, 2013 (KR) ........................ 10-2013-0086993

(51) Int. Cl.
| | | |
|---|---|---|
| *G06K 9/32* | (2006.01) | |
| *G06K 9/00* | (2006.01) | |
| *G06K 9/34* | (2006.01) | |
| *G06T 3/60* | (2006.01) | |
| *G06T 7/00* | (2006.01) | |

(52) U.S. Cl.
CPC ........... *G06T 3/606* (2013.01); *G06K 9/00288* (2013.01); *G06K 9/3275* (2013.01); *G06T 7/0081* (2013.01); *G06T 2219/2004* (2013.01)

(58) Field of Classification Search
CPC ................... G06T 3/606; G06K 2009/00328; G06K 9/00288; G06K 9/3275
USPC .......................................... 382/115, 173, 296
See application file for complete search history.

(56) References Cited

U.S. PATENT DOCUMENTS

| | | | | |
|---|---|---|---|---|
| 7,215,828 B2* | 5/2007 | Luo | ..................... | G06K 9/00664 382/289 |
| 8,005,271 B2* | 8/2011 | Kawada | ............. | G06K 9/00241 382/118 |
| 8,180,112 B2* | 5/2012 | Kurtz | ................. | G06K 9/00288 382/103 |
| 8,385,609 B2* | 2/2013 | Piramuthu | ......... | G06K 9/00234 382/115 |
| 8,498,446 B2* | 7/2013 | Steinberg | ........... | G06K 9/00228 348/143 |
| 8,503,721 B2* | 8/2013 | Tomita | ............... | G06K 9/00248 382/103 |
| 8,982,180 B2* | 3/2015 | Corcoran | .............. | G06T 3/0062 348/36 |
| 2006/0222264 A1 | 10/2006 | Guitarte Perez et al. | | |
| 2008/0001933 A1 | 1/2008 | Chen et al. | | |
| 2008/0158260 A1 | 7/2008 | Li | | |
| 2009/0051705 A1 | 2/2009 | Tsai et al. | | |

FOREIGN PATENT DOCUMENTS

JP   2008-277904 A   11/2008

* cited by examiner

*Primary Examiner* — Kanjibhai Patel
(74) *Attorney, Agent, or Firm* — Brundidge & Stanger, P.C.

(57) ABSTRACT

In one example embodiment, a device includes an object detector configured to: rotate an image multiple times in increments of a predetermined number of degrees, detect upright occurrences of at least one object from the image at each incremental rotation of the image, and divide the detected occurrences of the at least one detected object, at each incremental rotation of the image, into a corresponding classification; and a direction manager configured to: determine a normal direction of the image, based on a number of detected occurrences of the at least one detected object, at each incremental rotation of the image, for each corresponding classification.

10 Claims, 12 Drawing Sheets

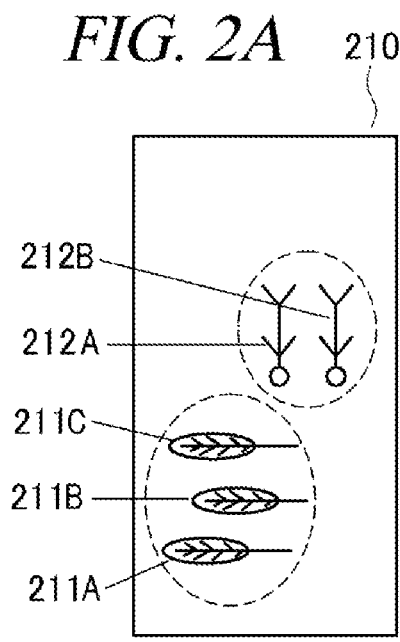

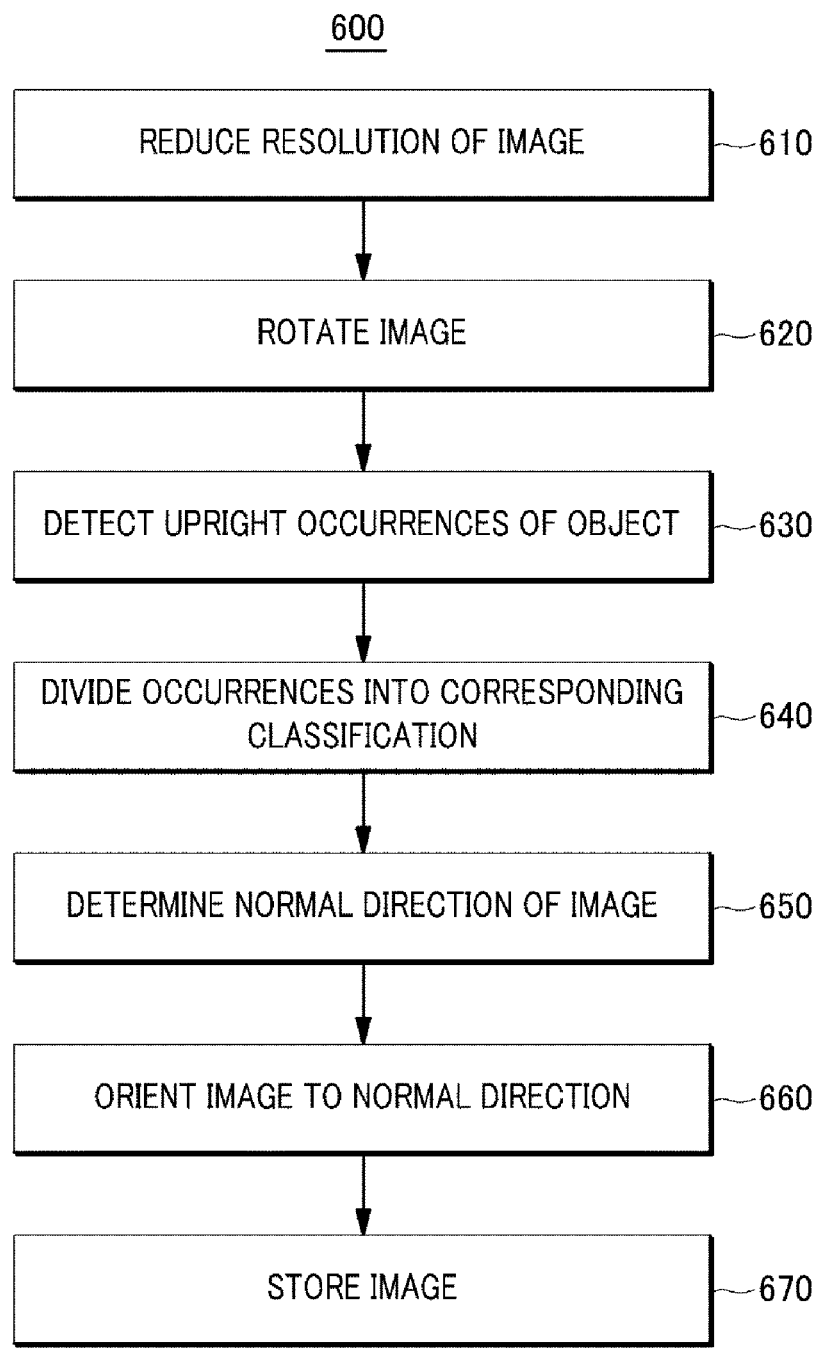

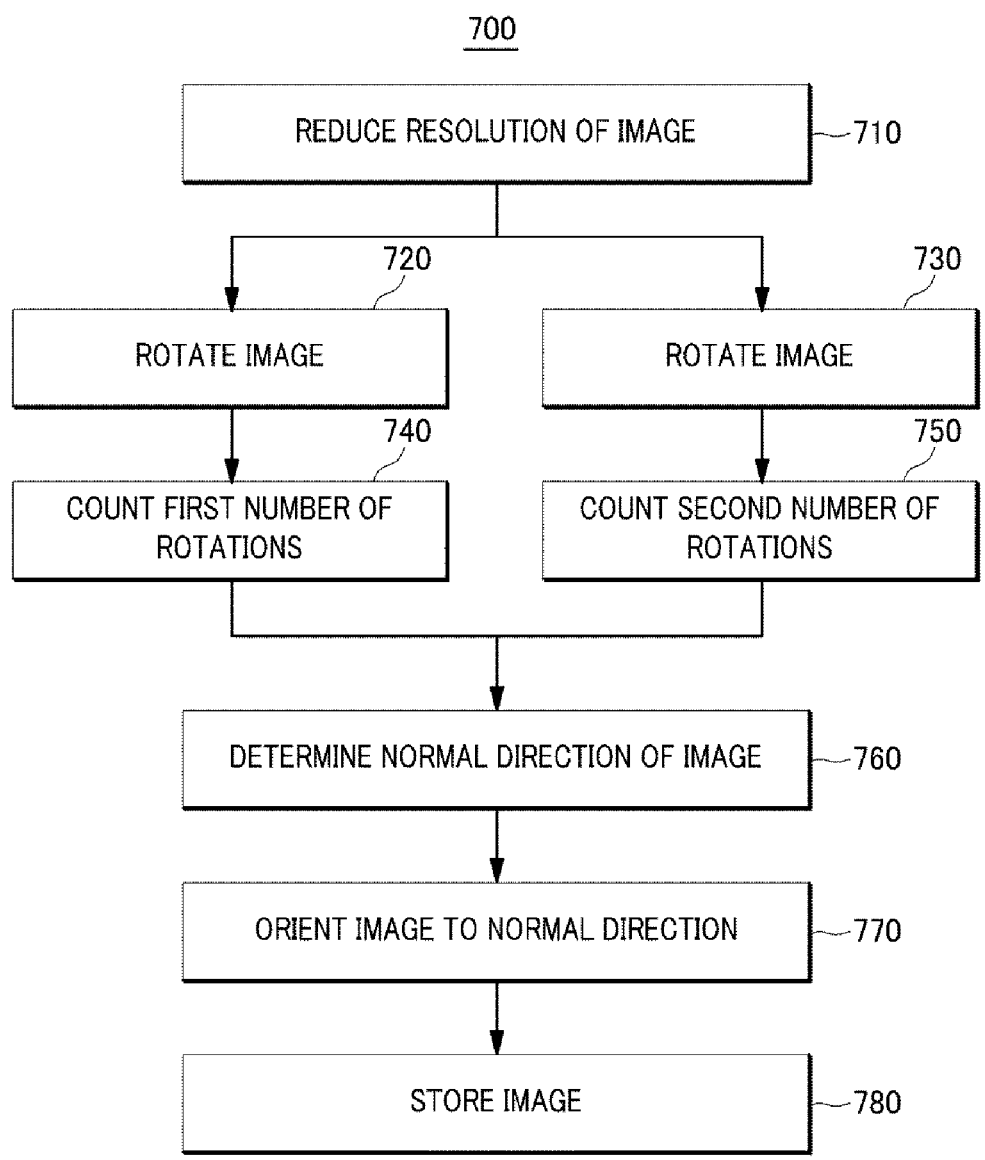

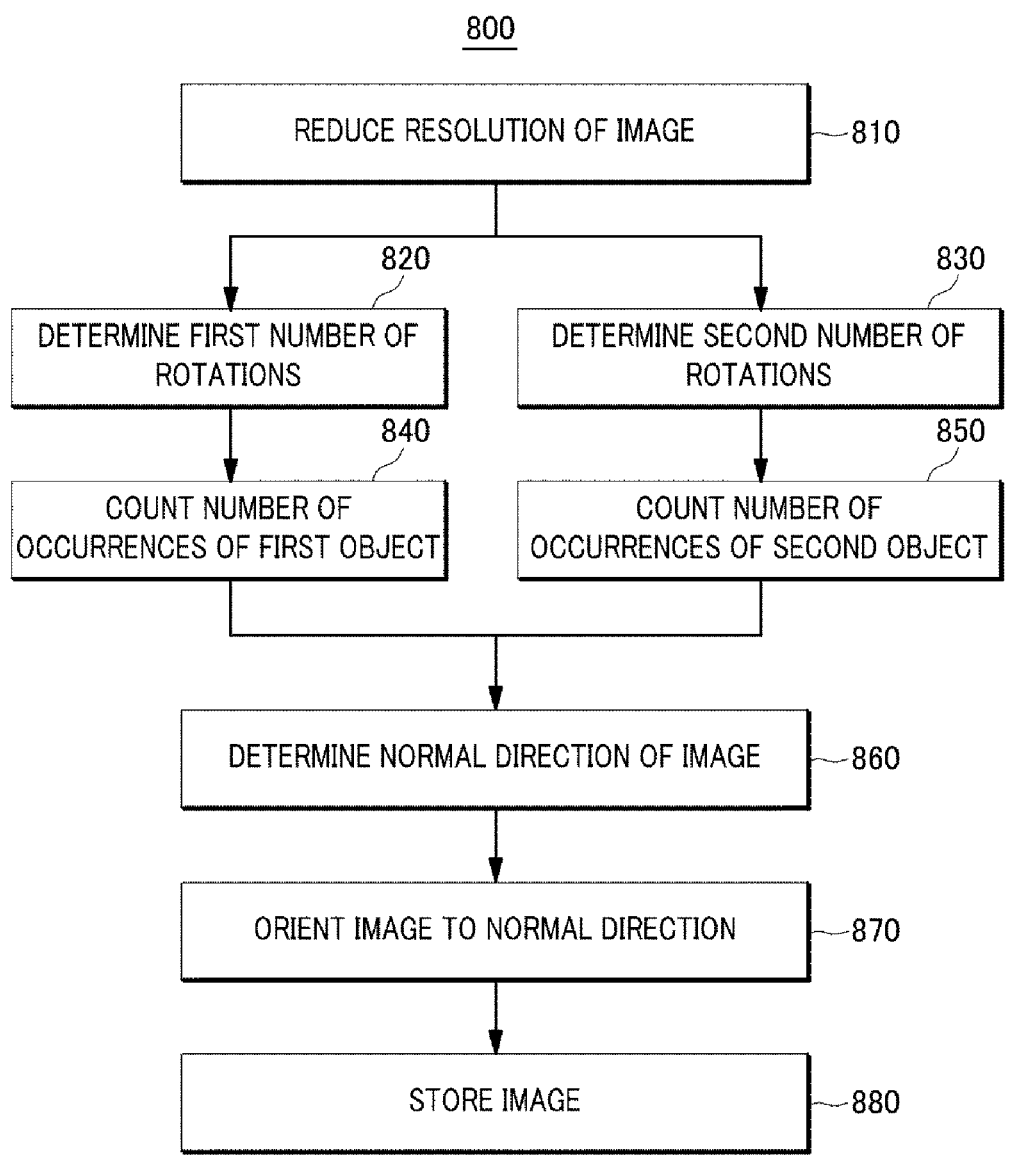

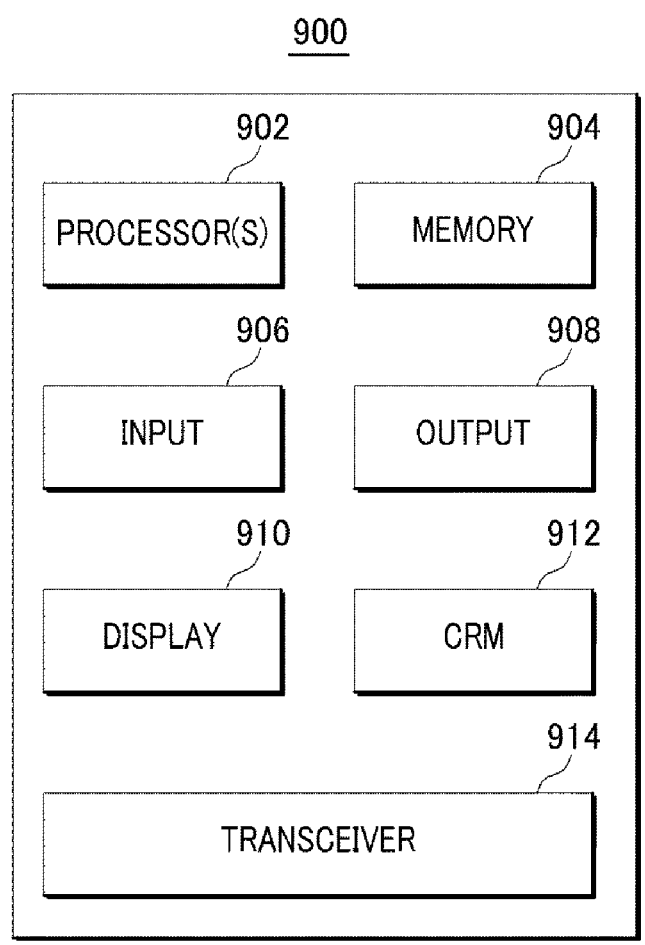

US 9,508,123 B2

IMAGE DIRECTION DETERMINATION

TECHNICAL FIELD

The embodiments described herein pertain generally to an image direction determining scheme.

BACKGROUND

Digital devices, in/on which digital cameras are installed, are ubiquitous. The digital cameras may convert an optical image into electronic image data and digitally record the image data on a storage medium. The recorded digital data may be retrieved from the storage medium and displayed on a display which is operatively coupled to the digital devices.

SUMMARY

In one example embodiment, a device may include an object detector configured to: rotate an image multiple times in increments of a predetermined number of degrees, detect upright occurrences of at least one object from the image at each incremental rotation of the image, and divide the detected occurrences of the at least one detected object, at each incremental rotation of the image, into a corresponding classification; and a direction manager configured to: determine a normal direction of the image, based on a number of detected occurrences of the at least one detected object, at each incremental rotation of the image, for each corresponding classification.

In another example embodiment, a device may include: a first object detector configured to: rotate an image multiple times in increments of a predetermined number of degrees, and count a first number of rotations for the image until at least one first object is detected in the image; a second object detector configured to: rotate the image multiple times in increments of the predetermined number of degrees, and count a second number of rotations for the image until at least one second object is detected in the image; and a direction manager configured to: determine a normal direction of the image to be a perspective of the image after either the first number of rotations of the image or the second number of rotations of the image, based on an order of priorities of the first object and the second object.

In yet another example embodiment, a device may include: a first object detector configured to: determine a first number of rotations for an image until at least one occurrence of a first object is detected in the image, and count a number of occurrences of the first object; a second object detector configured to: determine a second number of rotations for the image until at least one occurrence of a second object is detected in the image, and count a number of occurrences of the second object; and a direction manager configured to: determine a normal direction of the image to be a perspective of the image after either the first number of rotations of the image or the second number of rotations of the image based on a comparison of the number of occurrences of the first object to the number of occurrences of the second object.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent from the following detailed description. The use of the same reference numbers in different figures indicates similar or identical items.

FIGS. 2A to 2D show illustrative example images rotated by a device by which at least portions of a scheme for image direction determination may be implemented, in accordance with various embodiments described herein;

FIG. 6 shows an example processing flow of operations by which at least portions of a scheme for image direction determination may be implemented, in accordance with various embodiments described herein;

FIG. 7 shows another example processing flow of operations by which at least portions of a scheme for image direction determination may be implemented, in accordance with various embodiments described herein;

FIG. 8 shows still another example processing flow of operations by which at least portions of a scheme for image direction determination may be implemented, in accordance with various embodiments described herein; and FIG. 9 shows an illustrative computing embodiment, in which any of the processes and sub-processes of a scheme for image direction determination may be implemented as computer-readable instructions stored on a computer-readable medium, in accordance with various embodiments described herein.

DETAILED DESCRIPTION

Figure 1:
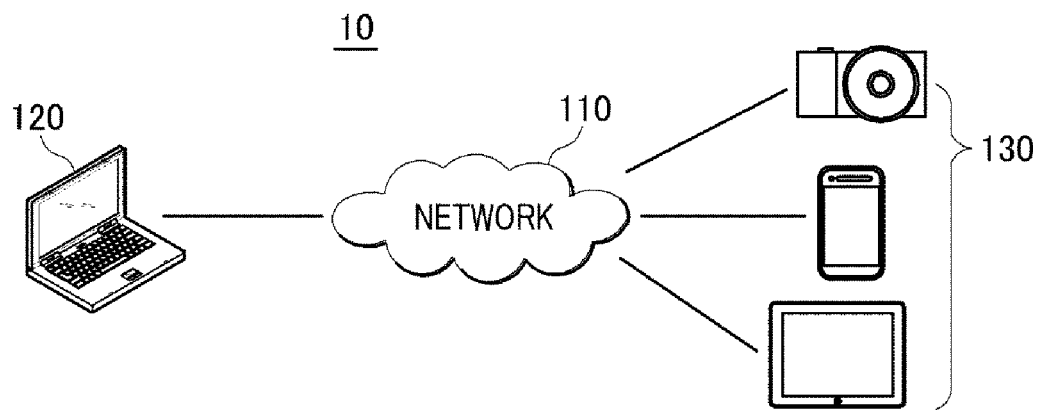
FIG. 1 shows an example system in which a scheme for image direction determination may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which a scheme for image direction determination may be implemented, in accordance with various embodiments described herein. As depicted in FIG. 1, system 10 may include, at least, an image processing device 120 and one or more end devices 130. At least two or more embodiments of image processing device 120 and end devices 130, respectively, may be communicatively connected to each other via a network 110.

Network 110 may include, as non-limiting examples, a wireless network such as a mobile radio communication network including at least one of a 3rd generation (3G), $4^{th}$ generation (4G), or $5^{th}$ generation (5G) mobile telecommunications network, various other mobile telecommunications networks, a satellite network, WiBro (Wireless Broadband Internet), Mobile WiMAX (World Interoperability for Microwave Access), HSDPA (High Speed Downlink Packet Access), Bluetooth, or the like.

Image processing device 120 may refer to one or more devices, apparatuses or servers that may be configured to determine a normal direction of a displayed image, based on one or more objects displayed in the image; to orient the displayed image to the determined normal direction; and to provide, to one or more end devices 130, the displayed image that is oriented to the normal direction. As non-limiting examples, image processing device 120 may refer to a notebook computer, a personal computer, a smart phone, a smart television, a digital camera, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro terminal.

Respective ones of one or more end devices 130, as non-limiting examples, may refer to a scanner, a notebook computer, a personal computer, a smart phone, a smart television, a digital camera, a tablet computer, a phablet device, or a personal communication terminal, such as PCS, GMS, PDC (Personal Digital Cellular), PDA, IMT-2000, CDMA-2000, W-CDMA and Wibro terminal.

In some embodiments, image processing device 120 may be configured to receive an image from respective ones of one or more end devices 130 via network 110. For example, but not as a limitation, the image may be a photo that was taken by respective ones of one or more end devices 130.

Image processing device 120 may be further configured to reduce a resolution of the received image using known technologies for this purpose. Further, image processing device 120 may be configured to store, in a memory, the image which has the reduced resolution.

Image processing device 120 may be configured to rotate the image which has the reduced resolution multiple times in increments of a predetermined number of degrees. In some embodiments, image processing device 120 may be configured to rotate the image using known image rotation technologies. For example, but not as a limitation, image processing device 120 may be configured to rotate the image up to three hundred sixty degrees in various increments of degrees, e.g., ninety degrees. In some embodiments, the increments of degrees may be changed and predefined in image processing device 120 by a user of image processing device 120; therefore, the embodiments described herein are not limited to rotations in increments of ninety degrees.

Image processing device 120 may be further configured to detect upright occurrences of at least one object from the displayed image at each incremental rotation of the image. Further, image processing device 120 may be configured to divide the detected upright occurrences of the at least one object, at each incremental rotation of the image, into a corresponding classification. As non-limiting examples, the classifications may include one or more of facial recognition; body recognition; animal recognition; spatial recognition, e.g., a vertical object having a height greater than its width, such as a tree or a streetlight; alphanumeric character recognition; or background object recognition, e.g., mountains or clouds.

In some embodiments, image processing device 120 may be configured to detect upright occurrences of displayed first objects (e.g., two people) from the image after a first incremental rotation of the image. For example, the first incremental rotation of the image may refer to a state in which the image has been rotated clockwise a first time (e.g., turned ninety degrees clockwise). Further, image processing device 120 may be configured to detect upright occurrences of displayed second objects (e.g., three tree images) from the image after a second incremental rotation of the image. For example, the second incremental rotation of the image may refer to a state in which the image has been rotated clockwise a second time (e.g., turned 180 degrees clockwise). Image processing device 120 may be configured to then classify the displayed images of the two people that are detected after the first incremental rotation of the image into a first classification group, such as "people;" and to classify the three displayed images of trees that are detected after the second incremental rotation of the image into a second classification, such as "vertical object."

Image processing device 120 may be further configured to determine a normal direction of the image, based on a number of detected upright occurrences of the at least one object, after each incremental rotation of the image, for each corresponding classification. According to at least one embodiment, image processing device 120 may be configured to determine the normal direction of the image to the direction having the greatest number of detected occurrences of the classified objects. Processing device 120 may be further configured to track the number of incremental rotations until the normal direction of the image is determined.

In some embodiments, image processing device 120 may be configured to compare the number of detected upright occurrences of the object upon completion of each incremental rotation of the displayed image. Per the above example, image processing device 120 may be configured to compare the number of detected upright occurrences of the first objects after the first incremental rotation of the image with the number of detected upright occurrences of the second objects after the second incremental rotation of the displayed image. Thus, in accordance with the above example, the number of detected upright occurrences of the first objects after the first incremental rotation is two and the number of detected upright occurrences of the second objects after the second incremental rotation is three. As a result of the comparison, the number of detected upright occurrences of the second objects after the second incremental rotation is greater than the number of detected upright occurrences of the first objects after the first incremental rotation. Image processing device 120 may be configured to then determine the direction after the second incremental rotation as the normal direction of the image, since the number of detected upright occurrences of the second objects after the second incremental rotation is greater than the number of detected upright occurrences of the first objects after the first incremental rotation.

Image processing device 120 may be further configured to orient or re-orient the displayed image to the determined normal direction. Further, image processing device 120 may be configured to store the displayed image that is re-oriented or oriented to the determined normal direction in an image storage. Per the above example, image processing device 120 turns the original image one hundred eighty degrees clockwise, and stores the turned image in an image storage. As non-limiting examples, the image storage may be at least one of a cloud storage, a storage server or device that is communicatively coupled to image processing device 120 or an internal database of image processing device 120.

Thus, FIG. 1 shows example system 10 in which a scheme for image direction determination may be implemented, in accordance with various embodiments described herein.

Figure 2B:
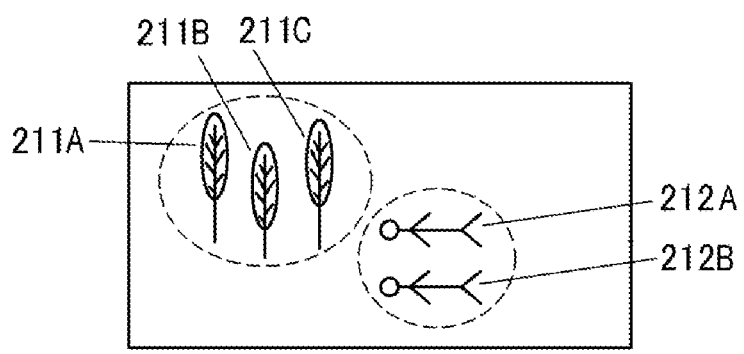

FIGS. 2A to 2D show illustrative example images rotated by a device by which at least portions of a scheme for image direction determination may be implemented, in accordance with various embodiments described herein. In some embodiments, image processing device 120 may be configured to receive an image 210 from end device 130 via network 110. For example, as depicted in FIG. 2A, three trees 211A, 211B and 211C and two people 212A and 212B are displayed in image 210.

Image processing device 120 may be configured to rotate image 210 multiple times in increments of a predetermined number of degrees. For example, but not as a limitation, image processing device 120 may be configured to rotate image 210 up to four times for a total of three hundred sixty degrees in increments of ninety degrees. The increments of degrees may be changed and predefined by a user of image processing device 120. Image processing device 120 may be further configured to detect upright occurrences of at least one object in displayed image 210 after each incremental rotation of image 210.

As depicted in FIGS. 2A and 2B, image processing device 120 may be configured to rotate image 210 one time in increments of ninety degrees. Image processing device 120 may be further configured to detect upright occurrences of three trees 211A, 211B and 211C in displayed image 210 after a first incremental rotation of image 210. For example, the first incremental rotation of displayed image 210 may refer to a state in which image 210 has been rotated clockwise, for a first time (e.g., turned ninety degrees clockwise) as depicted in FIG. 2B.

Figure 2C:
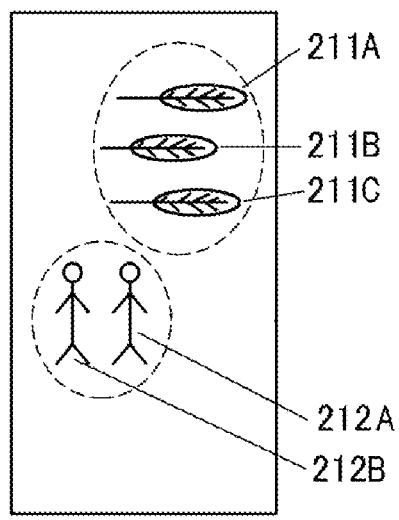

Further, as depicted in FIGS. 2B and 2C, image processing device 120 may be configured to rotate displayed image 210 one more time in increments of ninety degrees. Image processing device 120 may be further configured to detect upright occurrences of two displayed people 212A and 212B from image 210 at a second incremental rotation of image 210. For example, the second incremental rotation of image 210 may refer to a state in which displayed image 210 has been rotated clockwise a second time (e.g., turned 180 degrees clockwise) as depicted in FIG. 2C.

Figure 2D:
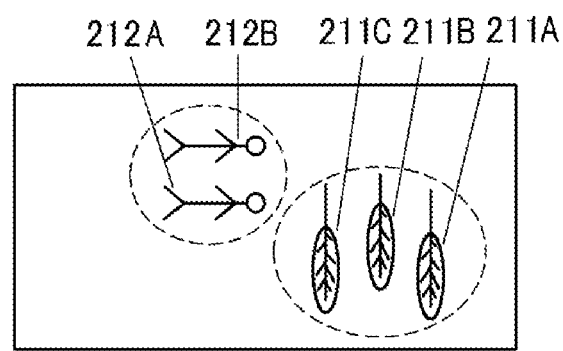

Further, as depicted in FIGS. 2C and 2D, image processing device 120 may be configured to rotate displayed image 210 one more time in increments of ninety degrees. As depicted in FIG. 2D, there are no upright occurrences of objects to be detected from image 210. As depicted in FIGS. 2A and 2D, image processing device 120 may be configured to rotate image 210 one more time in increments of ninety degrees. Further, as depicted in FIG. 2A, there are no upright occurrences of objects to be detected from image 210.

Image processing device 120 may be configured to determine a normal direction of displayed image 210, based on a number of detected upright occurrences of the at least one detected object at each incremental rotation of displayed image 210. In some embodiments, image processing device 120 may be configured to compare the number of detected upright occurrences of displayed objects after each incremental rotation of image 210. Further, image processing device 120 may be configured to determine the normal direction of image 210 to be the incremental rotation of image 20, which has the greatest number of detected occurrences of the objects. Per the above example, the highest numbers of upright occurrences of displayed objects (e.g., three trees 211A, 211B and 211C) are detected from image 210 after the first incremental rotation. Thus, image processing device 120 may be configured to determine the direction of displayed image 210 after the first incremental rotation (e.g., the state in which displayed image 210 has been rotated clockwise a first time (e.g., turned ninety degrees clockwise)) as the normal direction of the image.

Image processing device 120 may be further configured to orient or re-orient displayed image 210 to the determined normal direction (e.g., image processing device 120 may be configured to turn image 210 ninety degrees clockwise as depicted in FIG. 2B). Further, image processing device 120 may be configured to store displayed image 210 that is oriented or re-oriented to the determined normal direction in an image storage.

Thus, FIGS. 2A to 2D show illustrative example images rotated by a device by which at least portions of a scheme for image direction determination may be implemented, in accordance with various embodiments described herein.

Figure 3:
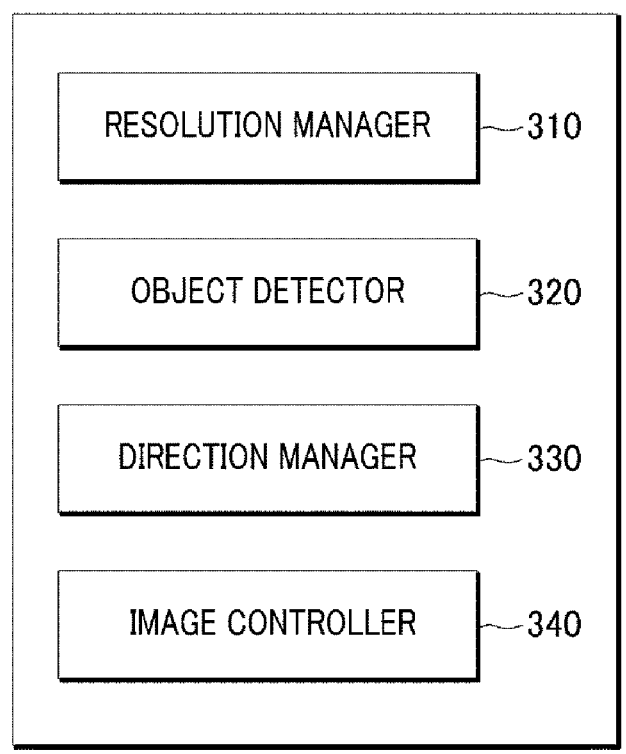
FIG. 3 shows an illustrative example device by which at least portions of a scheme for image direction determination may be implemented, in accordance with various embodiments described herein.

FIG. 3 shows an illustrative example device 120 by which at least portions of a scheme for image direction determination may be implemented, in accordance with various embodiments described herein. As depicted in FIG. 3, image processing device 120 may include a resolution manager 310, an object detector 320, a direction manager 330 and an image controller 340. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of resolution manager 310, object detector 320, direction manager 330 and image controller 340 may be included in an instance of an application hosted on image processing device 120.

Resolution manager 310 may be configured to reduce a resolution of a displayed image using known technologies for changing image resolution. Further, resolution manager 310 may be configured to store, in a memory, the displayed image after the resolution of which has been reduced.

Object detector 320 may be configured to rotate the displayed image for which the resolution has been reduced multiple times in increments of a predetermined number of degrees using known technologies for this purpose. For example, but not as a limitation, object detector 320 may be configured to rotate the image up to four times, for a maximum of three hundred sixty degrees, in increments of ninety degrees. The increments of degrees may be changed and predefined by a user of image processing device 120; thus, the embodiments described herein are not limited to rotation increments of ninety degrees.

Object detector 320 may be further configured to detect upright occurrences of at least one object displayed in the image after each incremental rotation of the image. Further, object detector 320 may be configured to divide the detected upright occurrences of the at least one object into a corresponding classification. As non-limiting examples, the classifications may include one or more facial recognition; body recognition; animal recognition; spatial recognition, e.g., a vertical object that has a height greater than its width, e.g., a tree or a streetlight; alphanumeric character recognition; or background object recognition, e.g., mountains or clouds.

Direction manager 330 may be configured to determine a normal direction of the displayed image, based on a number of detected upright occurrences of the at least one object, at each incremental rotation of the image, for each corresponding classification. In some embodiments, direction manager 330 may be configured to compare the number of detected upright occurrences of the object at each incremental rotation of the image, and to determine a normal direction of the image, based on the comparison result. For example, but not as a limitation, direction manager 330 may be configured to determine the normal direction of the image to be the direction having the greatest number of upright occurrences of the classified objects.

In some other embodiments, direction manager 330 may be configured to determine the normal direction of the image further based on an order of priorities of classifications of objects in displayed image 210. For example, it may be assumed that people are considered to be a classification of a higher order than that of alphanumeric characters. Even if the number of detected upright occurrences of alphanumeric characters after a first incremental rotation of the image is greater than the number of detected upright occurrences of people in the displayed image after a second incremental rotation of the image, direction manager 330 may be configured to determine the normal direction of the displayed image to be the direction of the displayed image after the second incremental rotation thereof. The order of priorities of classifications may be set or predefined by a user or an entity that may control and/or manipulate image processing device 120.

Image controller 340 may be configured to orient or re-orient the image to the normal direction determined by direction manager 330. Further, image controller 340 may be configured to store the displayed image that is oriented or re-oriented to the determined normal direction in an image storage. As non-limiting examples, the image storage may be at least one of a cloud storage or a storage server or a device that is communicatively coupled to image processing device 120 or an internal database of image processing device 120.

Thus, FIG. 3 shows an illustrative example device 120 by which at least portions of a scheme for image direction determination may be implemented, in accordance with various embodiments described herein.

Figure 4:
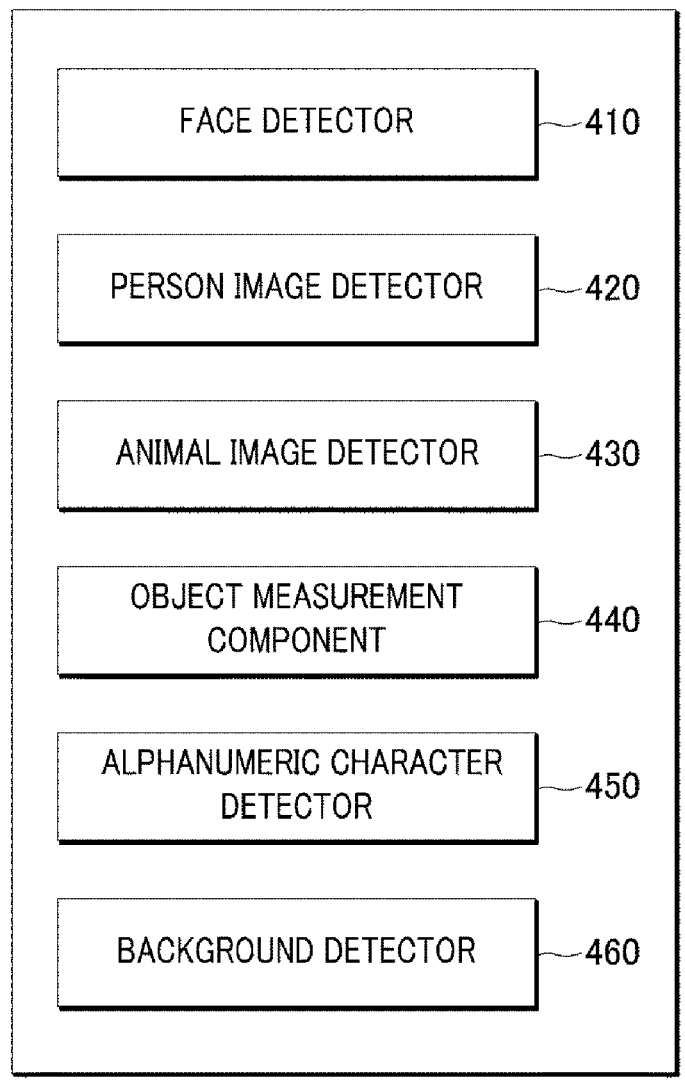
FIG. 4 shows an illustrative example object detector included in a device by which at least portions of a scheme for image direction determination may be implemented, in accordance with various embodiments described herein.

FIG. 4 shows an illustrative example object detector included in a device by which at least portions of a scheme for image direction determination may be implemented, in accordance with various embodiments described herein. As depicted in FIG. 4, object detector 320 may include a face detector 410, a person image detector 420, an animal image detector 430, an object measurement component 440, an alphanumeric character detector 450 and a background detector 460. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of face detector 410, person image detector 420, animal image detector 430, object measurement component 440, alphanumeric character detector 450 and background detector 460 may be included in an instance of an application hosted on image processing device 120.

Face detector 410 may be configured to detect one or more upright occurrences of at least one person's face displayed in an image after each rotation of the image in increments of a predetermined number of degrees. Further, face detector 410 may be configured to count a number of the upright occurrences of the person's face, which are detected after respective incremental rotations of the image.

In some embodiments, face detector 410 may be configured to detect one or more upright occurrences of the person's face from the image by using one or more of well-known face recognition techniques. For example, face detector 410 may be configured to recognize at least one of shape, texture, skin color or feature point of at least one person's face which is displayed in the image. Face detector 410 may be configured to identify one or more upright occurrences of a person's face by comparing the recognized face information, such as shape, texture, skin color or feature point, with a face template information that may include at least one of reference shape, texture, skin color, feature point of an ordinary person's face. The face template information may be pre-learned and be stored in image processing device 120.

Person detector 420 may be configured to detect one or more upright occurrences of a person's body that is displayed in the image after each rotation of the image in increments of a predetermined number of degrees. In some embodiments, person detector 420 may be configured to detect one or more upright occurrences of the person's face from the image by using one or more of well-known person image recognition techniques. For example, person detector 420 may be configured to identify one or more upright occurrences of a person's body by using a body template that may include at least one of reference shape, feature point or aspect ratio of an ordinary person's body. The body template may be pre-learned and be stored in image processing device 120.

Animal detector 430 may be configured to detect one or more upright occurrences of an animal that is displayed in the image after each rotation of the image in increments of a predetermined number of degrees. In some embodiments, animal detector 430 may be configured to detect one or more upright occurrences of the animal from the image by using one or more of well-known animal image and/or object recognition techniques. For example, animal detector 430 may be configured to identify one or more upright occurrences of an animal by using animal reference information that may include at least one of a face, a number of legs, a color of fur or texture of fur of one or more reference animals. The animal reference information may be pre-registered and be stored in image processing device 120.

Object measurement component 440 may be configured to detect one or more upright occurrences of at least one vertical object that is displayed in the image after each rotation of the image in increments of a predetermined number of degrees. In some embodiments, object measurement component 440 may be configured to compare height and width dimensions of a detected object, and to classify the objects having a height that is greater than its width into the vertical object. For example, but not as a limitation, the vertical object may include a tree, a building, a streetlight, etc.

Alphanumeric character detector 450 may be configured to detect one or more upright occurrences of at least one character or numeral that is displayed in the image after each rotation of the image in increments of a predetermined number of degrees. In some embodiments, alphanumeric character detector 450 may be configured to detect one or more upright occurrences of the character or numeral from the image by using one or more of well-known alphanumeric character recognition techniques.

Background detector 460 may be configured to detect one or more upright occurrences of at least one object that is displayed in a background area of the image after each rotation of the image in increments of a predetermined number of degrees by using one or more of well-known background recognition techniques. For example, but not as a limitation, the object to be displayed in a background area may include sky, ground, road, sea, mountain, etc.

Thus, FIG. 4 shows an illustrative example object detector included in a device by which at least portions of a scheme for image direction determination may be implemented, in accordance with various embodiments described herein.

Figure 5:
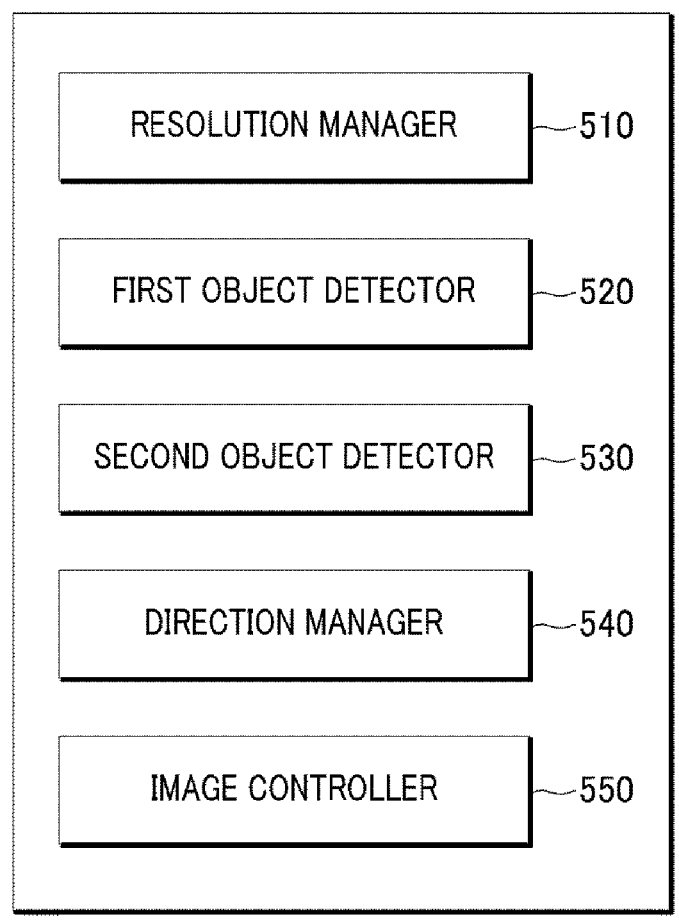
FIG. 5 shows another illustrative example device by which at least portions of a scheme for image direction determination may be implemented, in accordance with various embodiments described herein.

FIG. 5 shows another illustrative example device by which at least portions of a scheme for image direction determination may be implemented, in accordance with various embodiments described herein. As depicted in FIG. 5, image processing device 120 may include a resolution manager 510, a first object detector 520, a second object detector 530, a direction manager 540 and an image controller 550. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of resolution manager 510, first object detector 520, second object detector 530, direction manager 540 and image controller 550 may be included in an instance of an application hosted on image processing device 120.

Resolution manager 510 may be configured to reduce a resolution of an image using known technologies for this purpose. Further, resolution manager 510 may be configured to store, in a memory, the image that has the reduced resolution.

In some embodiments, first object detector 520 may be configured to rotate the image, for which the resolution has been reduced, multiple times in increments of a predetermined number of degrees using known technologies for this purpose. For example, but not as a limitation, first object detector 520 may be configured to rotate the image up to three hundred sixty degrees in various increments of degrees, e.g., ninety degrees. In some embodiments, the increments of degrees may be changed and predefined in image processing device 120 by a user of image processing device 120.

First object detector 520 may be further configured to detect upright occurrences of at least one first object which is displayed in the image. First object detector 520 may be further configured to count and determine a first number of rotations for the displayed image until the upright occurrences of the at least one first object are detected from the displayed image. Further, first object detector 520 may be configured to count a first number of the upright occurrences of the at least one first object. As non-limiting examples, the first object may include at least one of a face of a person, a body of a person, an animal, a vertical object having a height that is greater than its width, such as a tree or a building, an alphanumeric character or a background object such as mountains or sky.

Second object detector 530 may be configured to rotate the image, for which the resolution has been reduced, multiple times in increments of a predetermined number of degrees using known image rotation technologies for this purpose. For example, but not as a limitation, second object detector 530 may be configured to rotate the image up to three hundred sixty degrees in various increments of degrees, e.g., by ninety degrees.

Second object detector 530 may be further configured to detect upright occurrences of at least one second object which is displayed in the image. Second object detector 530 may be further configured to count and determine a second number of rotations for the displayed image until the upright occurrences of the at least one second object are detected in the displayed image. Further, second object detector 530 may be configured to count a second number of the upright occurrences of the at least one second object. The second object may be different from the first object. As non-limiting examples, the second object may include at least one of a face of a person, a body of a person, an animal, a vertical object having a height that is greater than its width, such as a tree or a building, an alphanumeric character or a background object such as mountains or the sky.

Direction manager 540 may be configured to determine a normal direction of the image to be a perspective of the image after either the first number of rotations of the displayed image or the second number of rotations of the displayed image, based on an order of priorities of the first object and the second object. In some embodiments, the order of priorities of the first object and the second object may be determined based on the first number of the upright occurrences of the displayed first object that are detected after the first number of rotations, and the second number of the upright occurrences of the displayed second object that are detected after the second number of rotations. For example, direction manager 540 may be configured to compare the first number of the detected upright occurrences of the displayed first object with the second number of the detected upright occurrences of the displayed second object. If the first number of the detected upright occurrences of the displayed first object is greater than the second number of the detected upright occurrences of the displayed second object, direction manager 540 may be configured to identify the first object to have a higher order than that of the second object. Direction manager 540 may be configured to then determine the normal direction of the image to be a perspective of the displayed image after the first number of rotations of the displayed image.

In some other embodiments, direction manager 540 may be configured to determine the normal direction of the image further based on an order of priorities of classifications of the first object and the second object in the displayed image. For example, the order of priorities of classifications may be set or predefined by a user or an entity that may control and/or manipulate image processing device 120. For example, it may be assumed that the first object is a person and the second object is an alphanumeric character and that people are considered to be a classification of a higher order than that of alphanumeric characters. Even if the first number of detected upright occurrences of people (i.e., the first object) in the displayed image after the first number of rotations of the image is greater than the number of detected upright occurrences of the alphanumeric characters (i.e., the second object) in the displayed image after the second number of rotations of the image, direction manager 540 may be configured to determine the normal direction of the displayed image to be a perspective of the image after the second number of rotations of the image.

Image controller 550 may be configured to orient or re-orient the image to the normal direction that is determined by direction manager 540. Further, image controller 550 may be configured to store the image that is oriented or re-oriented to the determined normal direction in an image storage. As non-limiting examples, the image storage may be at least one of a cloud storage or a storage server or device that is communicatively coupled to image processing device 120 or an internal database of image processing device 120.

Thus, FIG. 5 shows another illustrative example device by which at least portions of a scheme for image direction determination may be implemented, in accordance with various embodiments described herein.

FIG. 6 shows an example processing flow 600 of operations by which at least portions of a scheme for image direction determination may be implemented, in accordance with various embodiments described herein. The operations of processing flow 600 may be implemented by image processing device 120 including resolution manager 310, object detector 320, direction manager 330 and image controller 340, as illustrated in FIG. 3. Processing flow 600 may include one or more operations, actions, or functions as illustrated by one or more blocks 610, 620, 630, 640, 650, 660 and/or 670. Although illustrated as discrete blocks, various blocks may be divided into additional blocks, combined into fewer blocks, or eliminated, depending on the desired implementation. Processing may begin at block 610.

Block 610 (Reduce Resolution of Image) may refer to resolution manager 310 reducing a resolution of an image using known technologies for this purpose. For example, but not as a limitation, the image may be a photo that was taken and transmitted by one or more end devices 130. Processing may proceed from block 610 to block 620.

Block 620 (Rotate Image) may refer to object detector 320 rotating the image multiple times in increments of a predetermined number of degrees. For example, but not as a limitation, at block 620, object detector 320 may rotate the image up to three hundred sixty degrees clockwise or counter clockwise in various increments of degrees, e.g., ninety degrees. Processing may proceed from block 620 to block 630.

Block 630 (Detect Upright Occurrences of Object) may refer to object detector 320 detecting upright occurrences of at least one object which is displayed in the displayed image at each incremental rotation of the image. As non-limiting examples, the object may include at least one of a face of a person, a body of a person, an animal, a vertical object having a height that is greater than its width, such as a tree or a building, an alphanumeric character or a background object such as mountains. Processing may proceed from block 630 to block 640.

Block 640 (Divide Occurrences into Corresponding Classification) may refer to object detector 320 dividing the detected upright occurrences of the at least one object, at each incremental rotation of the image into a corresponding classification. As non-limiting examples, the classifications may include one or more of facial recognition; body recognition; animal recognition; spatial recognition, e.g., a vertical object having a height greater than its width, such as a tree or a streetlight; alphanumeric character recognition; or background object recognition, e.g., mountains or clouds. Processing may proceed from block 640 to block 650.

Block 650 (Determine Normal Direction of Image) may refer to direction manager 330 determining a normal direction of the displayed image, based on a number of detected upright occurrences of the at least one object, upon completion of each incremental rotation of the displayed image, for each corresponding classification. In some embodiments, direction manager 330 may compare the number of detected upright occurrences of the displayed object after each incremental rotation of the image, and may determine a normal direction of the image, based on the comparison result. For example, direction manager 330 may determine the normal direction of the image to be the direction having the greatest number of detected upright occurrences of the classified objects. Processing may proceed from block 650 to block 660.

Block 660 (Orient Image to Normal Direction) may refer to image controller 340 orienting or re-orienting the image to the normal direction determined at block 650. Processing may proceed from block 660 to block 670.

Block 670 (Store Image) may refer to image controller 340 storing, in an image storage, the image that is oriented or re-oriented to the normal direction at block 660. As non-limiting examples, the image storage may be at least one of a cloud storage or a storage server that is communicatively coupled to image processing device 120 or an internal database of image processing device 120.

Thus, FIG. 6 shows an example processing flow 600 of operations by which at least portions of a scheme for image direction determination may be implemented, in accordance with various embodiments described herein.

FIG. 7 shows another example processing flow 700 of operations by which at least portions of a scheme for image direction determination may be implemented, in accordance with various embodiments described herein. The operations of processing flow 700 may be implemented by image processing device 120 including resolution manager 510, first object detector 520, second object detector 530, direction manager 540 and image controller 550, as illustrated in FIG. 5. Processing flow 700 may include one or more operations, actions, or functions as illustrated by one or more blocks 710, 720, 730, 740, 750, 760, 770 and/or 780. Although illustrated as discrete blocks, various blocks may be divided into additional blocks, combined into fewer blocks, or eliminated, depending on the desired implementation. Processing may begin at block 710.

Block 710 (Reduce Resolution of Image) may refer to resolution manager 510 reducing a resolution of an image using known technologies for this purpose. For example, but not as a limitation, the image may be a photo that was taken and transmitted by one or more end devices 130. Processing may proceed from block 710 to block 720 and block 730.

Block 720 (Rotate Image) may refer to first object detector 520 rotating the image, for which the resolution has been reduced, multiple times in increments of a predetermined number of degrees. For example, but not as a limitation, at block 720, first object detector 520 may rotate the image up to three hundred sixty degrees in various increments of degrees, e.g., ninety degrees. Processing may proceed from block 720 to block 740.

Block 730 (Rotate Image) may refer to second object detector 530 rotating the image, for which the resolution has been reduced, multiple times in increments of a predetermined number of degrees. For example, but not as a limitation, at block 730, second object detector 530 may rotate the image up to three hundred sixty degrees in various increments of degrees, e.g., ninety degrees. Processing may proceed from block 730 to block 750.

Block 740 (Count First Number of Rotations) may refer to first object detector 520 counting a first number of rotations for the displayed image until upright occurrences of at least one first object are detected in the image. At block 740, first object detector 520 may detect a first number of upright occurrences of at least one first object which is displayed in the image. Further, first object detector 520 may count and determine the first number of rotations for the displayed image until the first number of upright occurrences of the at least one first object are detected in the image. As non-limiting examples, the first object may include at least one of a face of a person, a body of a person, an animal, a vertical object having a height that is greater than its width, such as a tree or a building, an alphanumeric character or a background object such as mountains or the sky. Processing may proceed from block 740 to block 760.

Block 750 (Count Second Number of Rotations) may refer to second object detector 530 counting a second number of rotations for the displayed image until upright occurrences of at least one second object are detected in the image. At block 750, second object detector 530 may detect a second number of upright occurrences of at least one second object which is displayed in the image. Further, second object detector 530 may count and determine the second number of rotations for the displayed image until the second number of upright occurrences of the at least one second object are detected in the image. The second object may be different from the first object. Processing may proceed from block 750 to block 760.

Block 760 (Determine Normal Direction of Image) may refer to direction manager 540 determining a normal direction of the image to be a perspective of the image after either the first number of rotations of the displayed image or the second number of rotations of the displayed image, based on an order of priorities of the first object and the second object. In some embodiments, the order of priorities of the first object and the second object may be determined based on the first number of upright occurrences of the first object that are detected after the first number of rotations of the image, and the second number of upright occurrences of the second object that are detected after the second number of rotations of the image. For example, at block 760, direction manager 540 may compare the first number of the upright occurrences of the first object with the second number of the upright occurrences of the second object. If the first number of the upright occurrences of the first object is greater than the second number of the upright occurrences of the second object, direction manager 540 may identify the first object to have a higher order than that of the second object. Then, direction manager 540 may determine the normal direction of the image to be a perspective of the displayed image after the first number of rotations of the image. Processing may proceed from block 760 to block 770.

Block 770 (Orient Image to Normal Direction) may refer to image controller 550 orienting or re-orienting the image to the normal direction determined at block 760. Processing may proceed from block 770 to block 780.

Block 780 (Store Image) may refer to image controller 550 storing, in an image storage, the image that is oriented or re-oriented to the normal direction at block 770. As non-limiting examples, the image storage may be at least one of a cloud storage or a storage server that is communicatively coupled to image processing device 120 or an internal database of image processing device 120.

Thus, FIG. 7 shows another example processing flow 700 of operations by which at least portions of a scheme for image direction determination may be implemented, in accordance with various embodiments described herein.

FIG. 8 shows still another example processing flow 800 of operations by which at least portions of a scheme for image direction determination may be implemented, in accordance with various embodiments described herein. The operations of processing flow 800 may be implemented by image processing device 120 including resolution manager 510, first object detector 520, second object detector 530, direction manager 540 and image controller 550, as illustrated in FIG. 5. Processing flow 800 may include one or more operations, actions, or functions as illustrated by one or more blocks 810, 820, 830, 840, 850, 860, 870 and/or 880. Although illustrated as discrete blocks, various blocks may be divided into additional blocks, combined into fewer blocks, or eliminated, depending on the desired implementation. Processing may begin at block 810.

Block 810 (Reduce Resolution of Image) may refer to resolution manager 510 reducing a resolution of an image using known technologies for changing image resolution. For example, but not as a limitation, the image may be a photo that was taken and transmitted by one or more end devices 130. Processing may proceed from block 810 to block 820 and block 830.

Block 820 (Determine First Number of Rotations) may refer to first object detector 520 determining a first number of rotations for the image until at least one upright occurrences of at least one first object are detected in the image. As non-limiting examples, the first object may include at least one of a face of a person, a body of a person, an animal, a vertical object having a height that is greater than its width, such as a tree or a building, an alphanumeric character or a background object such as mountains or the sky. Processing may proceed from block 820 to block 840.

Block 830 (Determine Second Number of Rotations) may refer to second object detector 530 determining a second number of rotations for the image until at least one upright occurrences of at least one second object are detected in the image. The second object may be different from the first object. Processing may proceed from block 830 to block 850.

Block 840 (Count Number of Occurrences of First Object) may refer to first object detector 520 counting a first number of the upright occurrences of the at least one first object which is displayed in the image. Processing may proceed from block 840 to block 860.

Block 850 (Count Number of Occurrences of Second Object) may refer to second object detector 530 counting a second number of the upright occurrences of the at least one second object which is displayed in the image. Processing may proceed from block 850 to block 860.

Block 860 (Determine Normal Direction of Image) may refer to direction manager 540 determining a normal direction of the image to be a perspective of the image after either the first number of rotations of the image or the second number of rotations of the image, based on a comparison of the first number of the upright occurrences of the at least one first object that are detected after the first number of rotations of the image and the second number of the upright occurrences of the at least one second object that are detected after the first number of rotations of the image. At block 860, direction manager 540 may compare the first number of the upright occurrences of the displayed first object with the second number of the upright occurrences of the displayed second object. If the first number of the upright occurrences of the displayed first object is greater than the second number of the upright occurrences of the displayed second object, direction manager 540 may determine the normal direction of the image to be a perspective of the image after the first number of rotations of the image. Processing may proceed from block 860 to block 870.

Block 870 (Orient Image to Normal Direction) may refer to image controller 550 orienting or re-orienting the image to the normal direction determined at block 860. Processing may proceed from block 870 to block 880.

Block 880 (Store Image) may refer to image controller 550 storing, in an image storage, the image that is oriented or re-oriented to the normal direction at block 870. As non-limiting examples, the image storage may be at least one of a cloud storage or a storage server or device that is communicatively coupled to image processing device 120 or an internal database of image processing device 120.

Thus, FIG. 8 shows still another example processing flow 800 of operations by which at least portions of a scheme for image direction determination may be implemented, in accordance with various embodiments described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 9 shows an illustrative computing embodiment, in which any of the processes and sub-processes of a scheme for image direction determination may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 900 may typically include, at least, one or more processors 902, a system memory 904, one or more input components 906, one or more output components 908, a display component 910, a computer-readable medium 912, and a transceiver 914.

Processor 902 may refer to, e.g., a microprocessor, a microcontroller, a digital signal processor, or any combination thereof.

Memory 904 may refer to, e.g., a volatile memory, non-volatile memory, or any combination thereof. Memory 904 may store, therein, an operating system, an application, and/or program data. That is, memory 904 may store executable instructions to implement any of the functions or operations described above and, therefore, memory 904 may be regarded as a computer-readable medium.

Input component 906 may refer to a built-in or communicatively coupled keyboard, touch screen, or telecommunication device. Alternatively, input component 906 may include a microphone that is configured, in cooperation with a voice-recognition program that may be stored in memory 904, to receive voice commands from a user of computing device 900. Further, input component 906, if not built-in to computing device 900, may be communicatively coupled thereto via short-range communication protocols including, but not limitation, radio frequency or Bluetooth.

Output component 908 may refer to a component or module, built-in or removable from computing device 900, that is configured to output commands and data to an external device.

Display component 910 may refer to, e.g., a solid state display that may have touch input capabilities. That is, display component 910 may include capabilities that may be shared with or replace those of input component 906.

Computer-readable medium 912 may refer to a separable machine readable medium that is configured to store one or more programs that embody any of the functions or operations described above. That is, computer-readable medium 912, which may be received into or otherwise connected to a drive component of computing device 900, may store executable instructions to implement any of the functions or operations described above. These instructions may be complimentary or otherwise independent of those stored by memory 904.

Transceiver 914 may refer to a network communication link for computing device 900, configured as a wired network or direct-wired connection. Alternatively, transceiver 914 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A device, comprising:
a resolution manager configured to reduce a resolution of an image;
an object detector configured to:
    rotate the image that has the reduced resolution multiple times in increments of a predetermined number of degrees,
    detect upright occurrences of at least one object from the image at each incremental rotation of the image,
    divide the detected occurrences of the at least one detected object, at each incremental rotation of the image, into a corresponding classification; and
a direction manager configured to:
    determine a normal direction of the image, based on a number of detected occurrences of the at least one detected object, at each incremental rotation of the image, for each corresponding classification.

2. The device of claim 1, further comprising:
an image controller configured to:
    orient the image to the determined normal direction, and
    store the image, oriented to the determined normal direction in an image storage.

3. The device of claim 1, wherein the object detector includes a face detector.

4. The device of claim 1, wherein the object detector includes a person image detector.

5. The device of claim 1, wherein the object detector includes an animal image detector.

6. The device of claim 1, wherein the object detector includes:
an object measurement component configured to compare height and width dimensions of a detected object and to classify objects having a height that is greater than its width from the image.

7. The device of claim 1, wherein the object detector includes an alphanumeric character detector.

8. The device of claim 1, wherein the object detector includes a background detector.

9. The device of claim 1, wherein the direction manager is configured to determine the normal direction of the image further based on an order of priorities of classifications of objects.

10. The device of claim 1, wherein the direction manager is configured to determine the normal direction of the image to be the incremental rotation of the image having the greatest number of detected occurrences of a classification of an object.

* * * * *